United States Patent [19]
von Gunten et al.

[11] Patent Number: 5,625,491
[45] Date of Patent: Apr. 29, 1997

[54] BROAD BAND POLARIZING BEAM SPLITTER

[75] Inventors: Marc K. von Gunten, Los Altos; Ron P. Bevis, San Jose, both of Calif.

[73] Assignee: Spectra-Physics Lasers, Inc., Mountain View, Calif.

[21] Appl. No.: 405,242

[22] Filed: Mar. 15, 1995

[51] Int. Cl.$^6$ ..................................................... G02B 5/30
[52] U.S. Cl. .................... 359/487; 359/483; 359/495; 359/496; 359/497; 359/498; 359/583; 359/586; 359/587; 359/589
[58] Field of Search .................... 359/483, 487, 359/494, 495, 496, 497, 498, 500, 583, 586, 587, 589

[56] References Cited

U.S. PATENT DOCUMENTS

| | | | |
|---|---|---|---|
| 2,403,731 | 7/1946 | MacNeille | 359/583 X |
| 2,815,695 | 12/1957 | Scharf et al. | 359/583 X |
| 3,998,524 | 12/1976 | Hubby, Jr. et al. | 359/496 X |
| 4,955,692 | 9/1990 | Merlin et al. | 359/584 X |
| 4,966,438 | 10/1990 | Mouchart et al. | 359/583 X |
| 5,339,441 | 8/1994 | Kardos et al. | 359/352 |
| 5,400,179 | 3/1995 | Ito | 359/588 |

*Primary Examiner*—Brian Healy
*Attorney, Agent, or Firm*—Wilson Sonsini Goodrich & Rosati

[57] ABSTRACT

A broad band polarizing beam splitter includes a first prism, including an incident beam surface, and an interface surface. A second prism is also included with an interface surface. The second prism is positioned adjacent to the first prism with the interface surfaces of the first and second prisms being adjacent to each other. A coating is disposed between the two interface surfaces. The coating is made of a geometric or arithmetic progression of layer thicknesses of alternating high and low refractive indices. A ratio of high refractive index to low refractive index is 1.1 or greater.

36 Claims, 2 Drawing Sheets

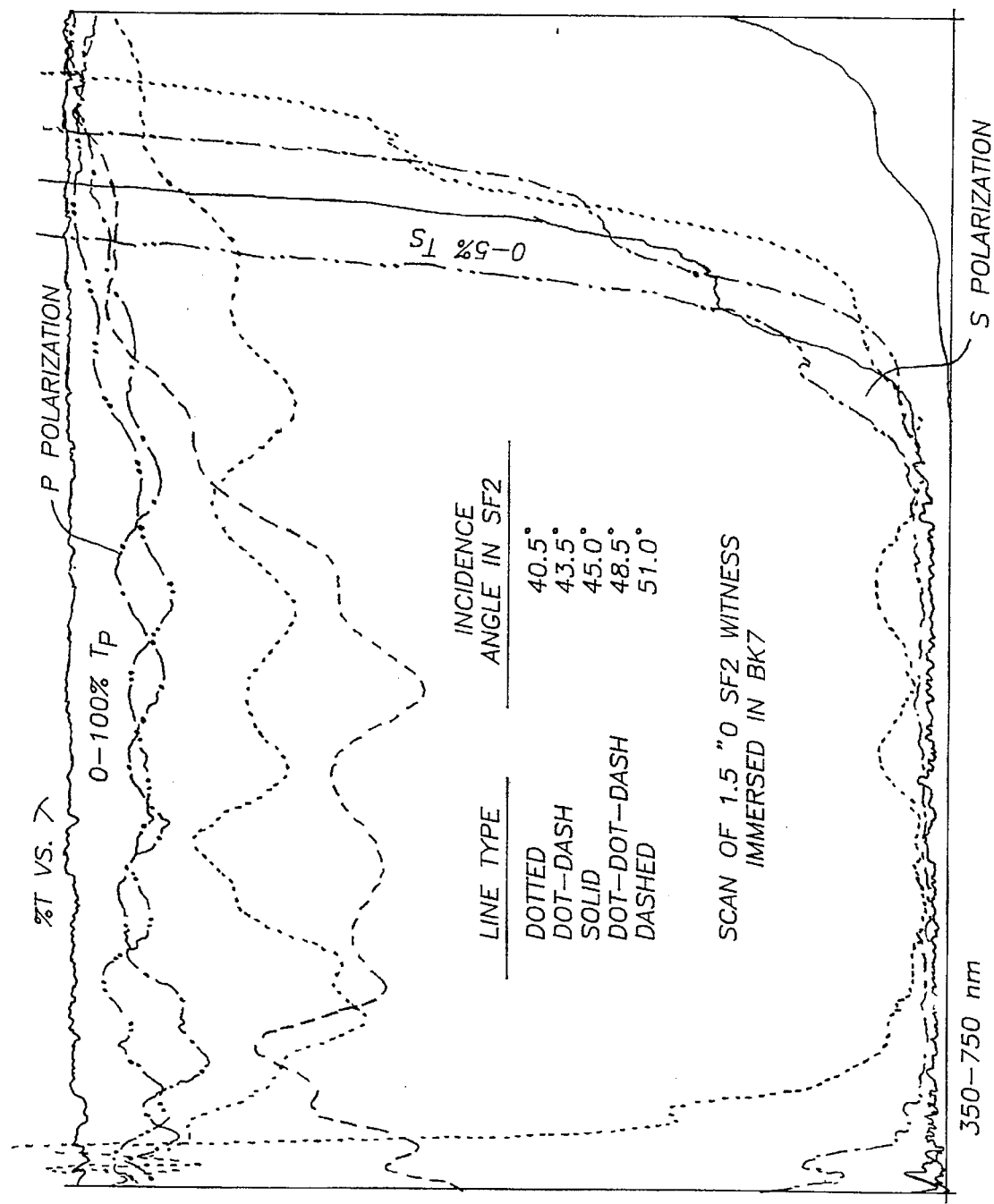

BROAD BAND POLARIZING BEAM SPLITTER

BACKGROUND OF THE INVENTION

1. Field of the Invention

This invention relates generally to polarizing beam splitters, and more particularly, to broad band polarizing beam splitters.

2. Description of Related Art

Beam splitter cubes consist generally of matched pairs of identical right angled prisms, with their hypotenuses faces cemented together. Prior to cementing, a partial reflection film is deposited onto one of the hypotenuse faces. A beam splitter cube can be made conveniently by using a thin, low-index transparent film as a precision spacer. Low-loss reflectors, whose transmittance can be controlled by frustrating internal reflection, are of considerable practical interest.

Cube beam splitters have several advantages over plate beam splitters and are widely used for a variety of reasons. Cube beam splitters deform much less when subjected to mechanical stress than a plate beam splitter. Traditionally, when cube beam splitters are used in convergent or divergent portions of an optical beam, they contribute substantial amounts of unwanted aberration. This is avoided or minimized by only using cube beam splitters with collimated, or nearly collimated beams.

Polarizing beam splitters are known in the art. These beam splitters typically have two prisms that are cemented together, hypotenuse-face-to-hypotenuse-face, with a special multilayer dielectric film in between. Monochromatic unpolarized light which is normally incident upon the external faces of the resulting cube (internally incident at 45 degrees upon the multi-layer film) is separated into two polarized beams which emerge from the cube through adjacent faces and in directions which are accurately 90 degrees apart. The beam, which passes straight through the cube, emerges linearly polarized with the plane of the electric field vector parallel to the plane of incidence defined for the multilayer film (p-polarized). The beam which emerges from the cube at right angles to the incident beam, having been reflected by the multi-layer film, is linearly polarized with the electric field vector orthogonal to the plane of incidence defined for the multilayer film (s-polarized).

At every dielectric interface within the stack of the multilayer film, the radiation is incident at or near Brewster's angle, and the p-polarized component is therefore transmitted with almost no reflection. These polarizing cubes are suitable for most of the monochromatic applications to which other polarizers might be applied, such as isolator construction, or the construction of electro-optic or magneto-optic modulators. They can also be used in laser Q-switches, though the use of an optical cement and the multilayer film prohibits use at high power. However, polarizing cubes have limitations. Light must be incident on the beam splitter coating at an angle of 45 degrees plus or minus 2 degrees. The angular sensitivity of these beam splitters not only requires that the cube be positioned accurately, but that only collimated or nearly collimatedbeams of light be used.

MacNeille polarizers are based on the principle that it is always possible to find an angle of incidence so that the Brewster condition for an interface between two materials of differing refractive index is satisfied. When this is so, the reflectance for the p-plane of polarisation vanishes. The s-polarized light is partially reflected and transmitted. To increase the s-reflectance, retaining the p-transmittance at or very near unity, the two materials may then be made into a multilayer stack. The layer thicknesses should be quarter-wave optical thicknesses at the appropriate angle of incidence. The construction of MacNeille beam splitters uses two prisms with a multi-layer dielectric between two faces of opposing right angled prisms. The advantage of a MacNeille polarizing beam splitters over other polarizers, such as the pile-of-plates polarizer, is its wide spectral range coupled with a large physical aperture. However, MacNeille beam splitters suffer from limited angular field, particularly at the center of its range, simply because the Brewster condition is met exactly only at the design angle.

Edge filters have also served as polarizing beam splitters. They also suffer the disadvantage of not covering the entire visible spectrum. When edge filters are used in color projection systems, one edge filter is used for the red, another one for the green, and a third one for the blue.

It would be desirable to provide to polarizing beam splitter with broad angular acceptance and a broad band width. It would be further desirable to provide a polarizing beam splitter with good throughput and that is less sensitive to errors in, (i) layer thicknesses, (ii) film deposition, and (iii) the refractive index of the layers.

SUMMARY OF THE INVENTION

Accordingly, it is an object of the invention to provide a polarizing beam splitter that has a broad angular acceptance.

Another object of the invention is to provide a polarizing beam splitter with a broad bandwidth.

Still another object of the invention is to provide a polarizing beam splitter with good throughput.

A further object of the invention is to provide a polarizing beam splitter that is less sensitive to errors in the dielectric layer thickness, deposition, and refractive indices of the layers.

Yet another object of the invention is to provide a polarizing beam splitter cube that is broad band.

These and other objects of the invention are achieved in a broad band beam polarizing beam splitter that includes a first prism. The first prism has an incident beam face and an interface surface. A second prism has an interface surface. The second prism is positioned adjacent to the first prism, with the interface surfaces of the first and second prisms being adjacent to each other. A coating is disposed between the two interface surfaces. The coating is made of a regular or harmonic (e.g., geometric or arithmetic) progression of layer thicknesses of alternating high and low refractive indices. The ratio of the high refractive index to the low refractive index is 1.1 or greater.

In another embodiment, the broad beam polarizing beam splitter is a cube. The cube includes a first prism half with first, second and third side faces. The first prism has a 90 degree angle between the first and second surfaces, an angle $\theta_1$ formed between the second surface and the third surface, and an angle $\alpha_1$ formed between the third surface and the first surface. A second prism half, with first, second and third side faces is also provided. The first and second surfaces of the second prism are in opposing relationships with the first and second surfaces of the first prism and define a cube. The third surfaces of both prisms are positioned adjacent to each other. The second prism half has a 90 degree angle between the first and second surfaces, an angle $\theta_2$ formed between the second surface and the third surface, and an angle $\alpha_2$ formed between the third surface and the first surface. A coating is disposed between the two interface surfaces and is made of a regular or harmonic (e.g., geometric or arithmetic) progression of layer thicknesses of alternating high and low refractive indices. The ratio of the high refractive index to the low refractive index is 1.1 or greater.

Further, the ratio of high refractive index to the low refractive index is 1.2 or greater. The beam splitter can further include an optical cement disposed on one of the interface surfaces. Alternatively, the first and second prisms are held together by optically contacting the two interface surfaces, or mechanically by providing a small air or vacuum space.

The beam splitter can have a wavelength range of from 250 or 1600 or less. In another embodiment, the wavelength range is from 400 to 700 nm.

Each of the prisms can have a refractive index of about 1.40 to 1.95, more preferably, 1.45 to 1.80. For a non-cubic beam splitter, an incident angle of a light ray striking an interface surface with the deposited coating is within plus or minus 4 degrees from a normal on the interface surface with the coating.

There is a design angle. The design angle is an angle of incidence at which incident light strikes the coating, and the Brewster condition is exactly met.

The beam splitter of the present invention has at a design angle, at which a Brewster condition is met, a P-transmission of greater than 95% averaged over a selected wavelength range with a P-transmission of greater than or equal to 99% at a central wavelength of the selected wavelength range, and a S-transmission of less than or equal to 0.5% averaged over the selected wavelength range, and less than or equal to 0.2% at the central wavelength of the selected wavelength range, which is when the Brewster condition is met, with a P-transmission of greater than 99% and a S-transmission of less than 0.2%. The central wavelength is at the midpoint of the wavelength range.

The broad band polarizing beam splitter has a range of incident angles at which a P-transmission is greater than or equal to 70% averaged over a selected wavelength range, and at which a S-transmission is less than or equal to 0.5% averaged over the selected wavelength range.

The broad band polarizing beam splitter has a design angle at which the Brewster condition is met and a polarizing ratio at the central wavelength is greater than 50:1 over the selected wavelength range.

The broad band polarizing beam splitter has a range of incident angles at which a polarizing ratio is greater than or equal to 100:1 over a selected wavelength range.

The coating has a low refractive layer index as high as 1.65, and a high refractive layer index as low as 1.65. The high refractive layer is selected from the group $TiO_2$, $Nb_2O_5$, $Ta_2O_5$, $HfO_2$, $ZrO_2$, $Y_2O_3$, $Al_2O_3$ and $Gd_2O_3$. The low refractive layer is selected from the group $Al_2O_3$, $SiO_2$, $MgF_2$ and $AlF_3$. Further, the physical thicknesses of the layers is 20 to 400 nm.

BRIEF DESCRIPTION OF THE FIGURES

FIG. 4 is a graph of the P-polarization and S-polarization components, at different incidence angles, for the beam splitter cube of FIG. 1.

DETAILED DESCRIPTION

Figure 1A:
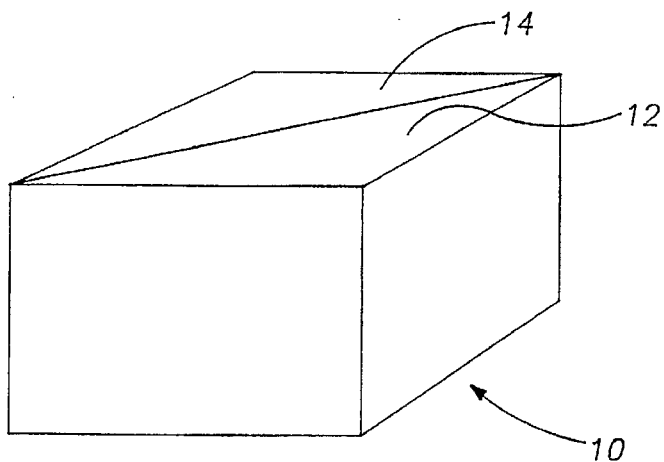
FIG. 1(a) is a perspective of view of a polarizing beam splitter cube of the present invention.

The present invention is a broad band, beam polarizing beam splitter which can have any one of numerous geometrical configurations, including but not limited to a cube, parallelogram, and the like. The broad band polarizing beam splitter includes first and second prisms, each with an interface surface. The two prisms are positioned so that their interface surfaces are adjacent to each other. A coating is disposed between the two interface surfaces. The coating is made of a geometric or arithmetic progression of layer thicknesses of alternating high and low refractive indexes. A ratio of the high refractive index to the low refractive index is 1.1 or greater. Preferably, the ratio is 1.2 or greater.

The coming can be deposited by techniques well known to those skilled in the art including but not limited to, PVD, sputtering, ion plating, CVD, chemical depth (sol gel), and the like.

The prisms are held together by an optical cement, by optically contacting the two interface surfaces, and can be mechanically coupled with an air or vacuum gap in between.

The beam splitter covers a wavelength range of from 250 to 1600 nm or less. In certain embodiments, the preferred wavelength range is 400 to 700 nm.

The first and second prisms each have a refractive index of about 1.40 to 1.95. More preferably, the refractive index is about 1.45 to 1.80.

For a non-cubic beam splitter, an incident angle of a light ray striking an interface surface with the deposited coating is within plus or minus 4 degrees from a normal on the interface surface with the coating.

There is a design angle. The design angle is an angle of incidence in which incident light strikes the coating, and the Brewster condition is exactly met.

The beam splitter of the present invention has at a design angle, at which a Brewster condition is met, a P-transmission of greater than 95% averaged over a selected wavelength range with a P-transmission of greater than or equal to 99% at a central wavelength of the selected wavelength range, and a S-transmission of less than or equal to 0.5% averaged over the selected wavelength range, and less than or equal to 0.2% at the central wavelength of the selected wavelength range, which is when the Brewster condition is met, with a P-transmission of greater than 99% and a S-transmission of less than 0.2%. The central wavelength is at the midpoint of the wavelength range.

The broad band polarizing beam splitter has a range of incident angles at which a P-transmission is greater than or equal to 70% averaged over a selected wavelength range, and at which a S-transmission is less than or equal to 0.5% averaged over the selected wavelength range.

The broad band polarizing beam splitter has a design angle at which the Brewster condition is met a polarizing ratio is equal to or greater than 400:1 at the design angle over a selected wavelength range.

The broad band polarizing beam splitter has a design angle at which the Brewster condition is met and a polarizing ratio at the central wavelength is greater than 50:1 over the selected wavelength range.

The coating between the two prisms has a low refractive index as high as 1.65. The coating has a high refractive index as low as 1.65. Suitable coating materials for the high refractive layer are selected from the group $TiO_2$, $Nb_2O_5$, $Ta_2O_5$, $HfO_2$, $ZrO_2$, $Y_2O_3$, $Al_2O_3$ and $Gd_2O_3$. Further, the low refractive layer is selected from the group $Al_2O_3$, $SiO_2$, $MgF_2$ and $AlF_3$. The physical thicknesses of the layers of the coating is on the order of from 20 to 400 nm.

The layer thickness progression is determined for arithmetic layers and is given by:

$$t, t(1+k), \ldots, t[1+(q-2)k], t[1+(q+1)k]$$

and for the geometric layers is given by:

$$t, kt, \ldots, kq^{q-2}t, k^{q-1}t$$

where q is the number of layers, t the monitoring wavelength for the first layer, and k the common difference or common ratio respectively.

For high through-put, the determination of the correct material indices for a design angle of incidence is given by the Brewster condition expressed as follows:

$$n_H/\cos\theta_H = n_L/\cos\theta_L$$

where H and L refer to the high and low refractive indices of the coating. Necessarily, for the P-reflectance to be minimum the P-admittances of the incident medium, film layers and substrate should be as close to each other as possible. Snell's law requires that:

$$n_H \sin\theta_H = n_L \sin\theta_L = n_G \sin\theta_G,$$

solving the equations for $\theta_H$, yields the equation:

$$\tan^2\theta_H = n_L^2/n_H^2,$$

where $n_H$ is the refractive index of the high index material;

$\theta_H$ is the cosine of the internal angle, the refracted angle inside the high index material;

$n_L$ is the refractive index of the low index material; and $\theta_L$ is the cosine of the internal angle, the refracted angle inside the low index material.

The thickness of a layer is determined by one of the two equations (arithmetic or geometric). Layer count and thickness end points of the layer progression are selected to cover the required bandwidth and the degree of extinction. The design of broad band polarizing beam splitter can be accomplished two ways, (i) select the design angle of incidence for the prism hypotenuse, then calculate the required indices of glass (substrate) and coating layers, or (ii) select the glass (substrate) refractive index, then calculate the design angle for the prism and the required film indices.

Figures 1B, 1C:
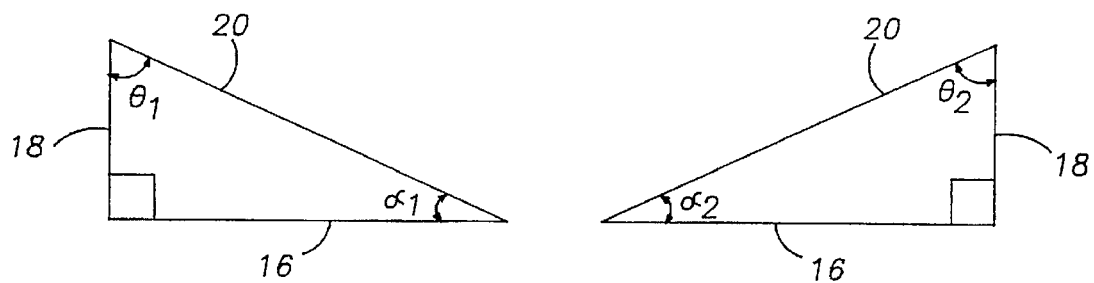
FIG. 1(b) illustrates the three sides of a first prism half comprising the beam splitter cube of FIG. 1.
FIG. 1(c) illustrates the three sides of a second prism half comprising the beam splitter cube of FIG. 1.

Referring now to FIGS. 1(a) to 1(c), a polarizing beam splitter is a cube 10 that comprises a first prism half 12 and a second prism half 14. Each prism half has a first surface 16, a second surface 18 and a third surface 18 (FIGS. 1(a) and 1(b). First surface 16, second surface 18 and third surface 20 are positioned so that first surface 16 and second surface 18 of second prism 14 are in opposing relationships with first surface 16 and second surface 18 of first prism 12, defining a cube. Third surfaces 20 are positioned adjacent to each other.

First prism half 12 has a 90 degree angle between first surface 16 and second surface 18, an angle $\theta_1$ formed between second surface 18 and third surface 20, and an angle $\alpha_1$ formed between third surface 20 and first surface 16.

Second prism half 14 has a ninety degree angle formed between first and second surfaces 16 and 18, an angle $\theta_2$ formed between second and third surfaces 18 and 20, and an angle $\alpha_2$ formed between third surface 20 and first surface 16.

Figures 2, 3:
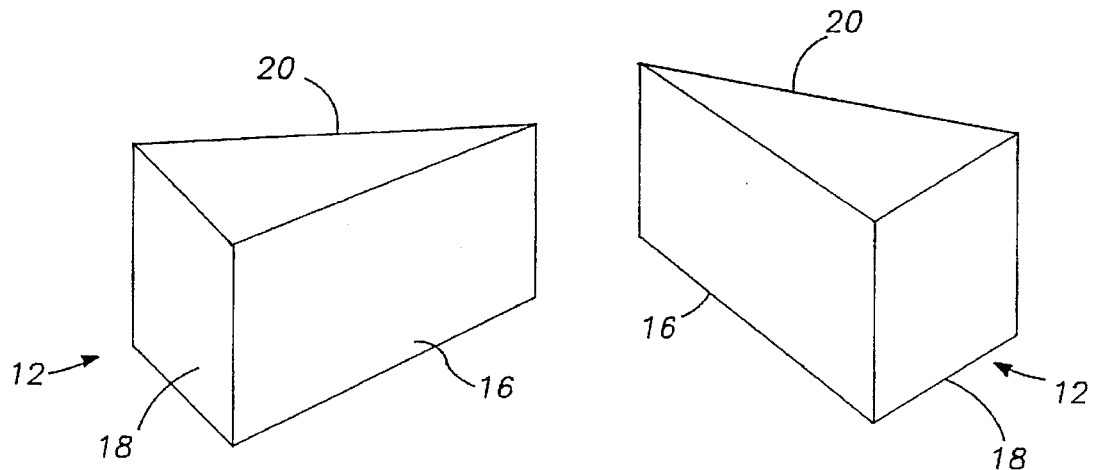
FIG. 2 is a perspective of the first prism half of the beam splitter cube of FIG. 1.
FIG. 3 is a perspective of the second prism half of the beam splitter cube of FIG. 1.

A perspective view of first prism half 12 is shown in FIG. 2, while a perspective view of second prism half 14 is shown in FIG. 3.

A multi-layer coating 22 is deposited on third surface 20 of first or second prism halls 12 or 14. Coating 22 is made of a geometric progression of layered thicknesses of alternating high and low refractive indices. A ratio of high refractive index to the low refractive index is 1.1 or greater, and can be 1.2 or greater.

Generally, there are two materials, each of a different refractive index. These are applied to the substrate in alternating fashion, and the thicknesses of the layers is a geometric or arithmetic progression. Layering is critical. The starting layer thickness and a final layer thickness determines the thickness increments. The physical thicknesses of the layers can be from 20 to 400 nm.

Prisms 12 and 14 can have an optical cement 24 disposed between them, the two prisms can be held together by optically contact or mechanically with an air space or vacuum formed between. Optical cement 24 can have a low refractive index in the range of about 1.45 to 1.55. It is preferred that optical cement 24 has substantially the same refractive index as a refractive index of the prism half 12 or 14 on which it is applied to. Further, it will be appreciated that optical cement 24 can be applied to both prism halls 12 and 14. However, for manufacturing purposes it is easier if optical cement 24 is applied to only one the prisms.

The substrate, coating 22, optical cement 24 and the incidence angel are all chosen to meet the Brewster condition at the central wavelength of the desired spectral regions. At the Brewster condition, there is maximal splitting of no reflected P light.

Prism half 12 or 14 with deposited coating 22 is also known as the substrate, while the non-coated prism half 12 or 14 is called the incident medium.

First and second surfaces 16 and 18 of each prism 12 and 14 are each coated with an anti-reflection coating well known to those skilled in the art. In one embodiment of the invention, the anti-reflection coating reduces first and second prism halfs 12 and 14 bare reflectance to about 0.25% or less. Further, the anti-reflection coating can be a 400 to 700 nm coating. It will be appreciated that the anti-reflection coating can reflect different wavelengths depending on the application of polarizing beam splitter 10.

First and second prism halfs 12 and 14 can be made of a variety of materials, including but not limited to glass, and can have a refractive index in the range of about 1.40 to 1.80, and preferably 1.45 to 1.80. In one embodiment, prism halfs 12 and 14 are made of the same material. The selection of prism material is dependent on a variety of factors, including band width, extinction ratio and through-put.

Polarizing beam splitter 10 has a broad angular acceptance. A light ray striking on an incident first or second surfaces 16 of first or second prisms 12 or 14 is within plus or minus 6 degrees from a normal on the incident surface 16.

Polarizing beam splitter 10 has at a design angle, at which a Brewster condition is met, a P-transmission of greater than or equal to 95% averaged over a selected wavelength range, with a P-transmission of greater than or equal to 99% at a central wavelength of the selected wavelength range, and a S-transmission of less than or equal to 0.5% averaged over the selected wavelength range, and less than or equal to 0.2% at the central wavelength of the selected wavelength range.

Further polarizing beam splitter 10 has a range of incident angles at which a P-transmission is greater than or equal to 70% averaged over a selected wavelength range, and at which a S-transmission is less than or equal to 0.5% averaged over the selected wavelength range.

The broad band polarizing beam splitter has a design angle at which the Brewster condition is met and a polarizing ratio at the central wavelength is greater than 50:1 over the selected wavelength range. Polarizing beam splitter 10 has a range of incident angles at which a polarizing ratio is greater than or equal to 100:1 over a selected wavelength range.

Polarizing beam splitter 10 has a broad wavelength range which can be in the range of from 250 nm to 1600 nm, and 400 to 700 nm for certain applications. Polarizing beam splitter 10 is less sensitive to errors in the deposition, thickness or refractive index of coating 22 because there is a spread in layer thicknesses.

FIG. 4 is a scan of P and S polarizations. This family of curves at the top represents P polarization, and it is scanned from about 300 or 350 nm up to about 750 nm. There is an angle at which the performance is optimal. The through-put (polarizing ratio) and extinction ratio are optimal. At the angle 45 degrees there is transmission of the P polarization between about 96% and 99%. As the angle is moved away from 45 degrees the through-put in P polarization degrades. The lower family of curves is for the S polarization. It is noted that the present invention provides far less detuning than prior art designs.

If one of the prisms does not include an AR coating, then the measured transmission is less than that obtained through AR coating. There is reflection loss at the uncoated prism surface.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A broad band polarizing beam splitter, comprising:
   a first prism including an incident beam surface and an interface surface;
   a second prism with an interface surface, the second prism being positioned adjacent to the first prism with the interface surfaces of the first and second prisms being adjacent to each other; and
   a coating disposed between the two interface surfaces made of layers with alternating high and low refractive indices, the coating having a ratio of high refractive index to a low refractive index of 1.1 or greater with two of the layers having different thickness wherein the broad band polarizing beam splitter operates in a wavelength range of 250 to 1600 nm.

2. The broad band polarizing beam splitter of claim 1, wherein the ratio of high refractive index to the low refractive index if 1.2 or greater.

3. The broad band polarizing beam splitter of claim 1, further comprising:
   an optical cement disposed on one of the interface surfaces.

4. The broad band polarizing beam splitter of claim 1, wherein the first and second prisms are held together by optically contacting the two interface surface.

5. The broad band polarizing beam splitter of claim 1, wherein the first and second prisms are mechanically held together creating an air or vacuum space between the two interface surfaces.

6. The broad band polarizing beam splitter of claim 1, wherein the broad band polarizing beam splitter has a wavelength range of from 400 to 700 nm.

7. The broad band polarizing beam splitter of claim 1, wherein the first and second prisms each have a refractive index of about 1.40 to 1.95.

8. The broad band polarizing beam splitter of claim 1, wherein the first and second prisms each have a refractive index of about 1.45 to 1.80.

9. The broad band polarizing beam splitter of claim 1, wherein an incident angle of a light ray striking an interface surface with the deposited coating is within plus or minus 4 degrees from a normal on the interface surface with the coating.

10. The broad band polarizing beam splitter of claim 1, wherein the broad band polarizing beam splitter has at a design angle, at which a Brewster condition is met, a P-transmission of greater than or equal to 95% averaged over a selected wavelength range with a P-transmission of greater than or equal to 99% at a central wavelength of the selected wavelength range, and a S-transmission of less than or equal to 0.5% averaged over the selected wavelength range, and less than or equal to 0.2% at the central wavelength of the selected wavelength range.

11. The broad band polarizing beam splitter of claim 1, wherein the broad band polarizing beam splitter has a range of incident angles at which a P-transmission is greater than or equal to 70% averaged over a selected wavelength range, and at which a S-transmission is less than or equal to 0.5% averaged over the selected wavelength range.

12. The broad band polarizing beam splitter of claim 1, wherein the broad band polarizing beam splitter has a design angle at which the Brewster condition is met and a polarizing ratio at the central wavelength is greater than 50:1 over the selected wavelength range.

13. The broad band polarizing beam splitter of claim 1, wherein the broad band polarizing beam splitter has a range of incident angles at which a polarizing ratio is greater than or equal to 100:1 over a selected wavelength range.

14. The broad band polarizing beam splitter of claim 1, wherein the coating has a low refractive index as high as 1.65.

15. The broad band polarizing beam splitter of claim 1, wherein the coating has high refractive index as low as 1.65.

16. The broad band polarizing beam splitter of claim 1, wherein the high refractive index layer is selected from the group $TiO_2$, $Nb_2O_5$, $Ta_2O_5$, $HfO_2$, $ZrO_2$, $Y_2O_3$, $Al_2O_3$ and $Gd_2O_3$.

17. The broad band polarizing beam splitter of claim 1, wherein the low refractive index layer is selected from the group $Al_2O_3$, $SiO_2$, $MgF_2$ and $AlF_3$.

18. The broad band polarizing beam splitter of claim 1, wherein the physical thicknesses of the layers is 20 to 400 nm.

19. A broad band polarizing beam splitter cube, comprising:
   a first prism half with first, second and third side faces, the first prism half having a 90 degree angle between the first and second surfaces, an angle $\theta_1$ formed between the second surface and the third surface, and an angle $\alpha_1$ formed between the third surface and the first surface;
   a second prism half with first, second and third side faces, the first end second surfaces of the second prism being in opposing relationships with the first and second surfaces of the first prism to define a cube, and the third surfaces of the first and second prism halves are positioned adjacent to each other, the second prism half having a 90 degree angle between the first and second surfaces, an angle $\theta_2$ formed between the second surface and the third surface, and an angle $\alpha_2$ formed between the third surface and the first surface; and a coating disposed between the third surfaces of the first and second prisms, the coating being made layers with alternating high and low refractive indices, the coating having a ratio of high refractive index to a low refractive index of 1.1 or greater with two of the layers having different thickness wherein the broad band polarizing beam splitter operates in a wavelength range of 250 to 1600 nm.

20. The broad band polarizing beam splitter of claim 19, wherein the ratio of the high refractive index to the low refractive index is 1.2 or greater.

21. The broad band polarizing beam splitter of claim 19, further comprising:

an optical cement disposed on one of the interface surfaces.

22. The broad band polarizing beam splitter of claim 19, wherein the first and second prisms are held together by optically contacting the two interface surface.

23. The broad band polarizing beam splitter of claim 19, wherein the first and second prisms are mechanically held together creating an air or vacuum space between the two interface surfaces.

24. The broad band polarizing beam splitter of claim 19, wherein the broad band polarizing beam splitter has a wavelength range of from 400 to 700 nm.

25. The broad band polarizing beam splitter of claim 19, wherein the first and second prisms each have a refractive index of about 1.40 to 1.95.

26. The broad band polarizing beam splitter of claim 19, wherein the first and second prisms each have a refractive index of about 1.45 to 1.80.

27. The broad band polarizing beam splitter of claim 19, wherein a light ray striking on an incident first or second surface of the first or second prism is within plus or minus 6 degrees from a normal on the incident surface.

28. The broad band polarizing beam splitter of claim 19, wherein the broad band polarizing beam splitter has at a design angle, at which a Brewster condition is met, a P-transmission of greater than or equal to 95% averaged over a selected wavelength range with a P-transmission of greater than or equal to 99% at a central wavelength of the selected wavelength range, and a S-transmission of less than or equal to 0.5% averaged over the selected wavelength range, and less than or equal to 0.2% at the central wavelength of the selected wavelength range.

29. The broad band polarizing beam splitter of claim 19, wherein the broad band polarizing beam splitter has a range of incident angles at which a P-transmission is greater than or equal to 70% averaged over a selected wavelength range, and at which a S-transmission is less than or equal to 0.5% averaged over the selected wavelength range.

30. The broad band polarizing beam splitter of claim 19, wherein the broad band polarizing beam splitter has a design angle at which the Brewster condition is met and a polarizing ratio at the central wavelength is greater than 50:1 over the selected wavelength range.

31. The broad band polarizing beam splitter of claim 19, wherein the broad band polarizing beam splitter has a range of incident angles at which a polarizing ratio is greater than or equal to 100:1 over a selected wavelength range.

32. The broad band polarizing beam splitter of claim 19, wherein the coating has a low refractive index as high as 1.65.

33. The broad band polarizing beam splitter of claim 19, wherein the coating has high refractive index as low as 1.65.

34. The broad band polarizing beam splitter of claim 19, wherein the high refractive index layer is selected from the group $TiO_2$, $Nb_2O_5$, $Ta_2O_5$, $HfO_2$, $ZrO_2$, $Y_2O_3$, $Al_2O_3$ and $Gd_2O_3$.

35. The broad band polarizing beam splitter of claim 19, wherein the low refractive index layer is selected from the group $Al_2O_3$, $SiO_2$, $MgF_2$ and $AlF_3$.

36. The broad band polarizing beam splitter of claim 19, wherein the physical thicknesses of the layers is 20 to 400 nm.

* * * * *